R. W. WELCH.
Rail.
No. 209,739.    Patented Nov. 5, 1878.
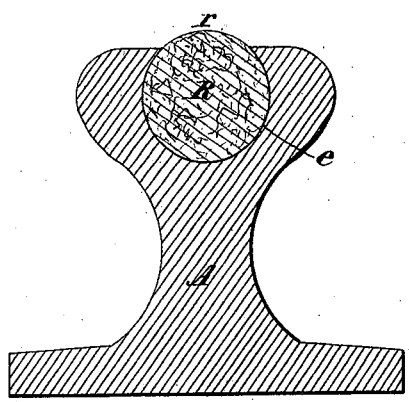
Witnesses.    Inventor.

UNITED STATES PATENT OFFICE.

ROSIA W. WELCH, OF GEORGETOWN, DISTRICT OF COLUMBIA, ASSIGNOR OF FOUR-FIFTHS HIS RIGHT TO EDWARD P. WELCH, JAMES H. WELCH, JAMES P. WILLETT, AND CHARLES REED, OF SAME PLACE.

IMPROVEMENT IN RAILS.

Specification forming part of Letters Patent No. 209,739, dated November 5, 1878; application filed September 26, 1878.

*To all whom it may concern:*

Be it known that I, ROSIA W. WELCH, of Georgetown, in the county of Washington and District of Columbia, have invented a certain new and Improved Rail for Elevated Railways; and I do hereby declare the following to be a full, clear, and exact description of the same, reference being had to the accompanying drawings, forming part of this specification, in which my invention is represented by a transverse vertical section.

The object of the invention is to prevent, as far as practicable, the vibration of elevated-railway structures and bridges and the consequent noise occasioned by the passage of cars over them; and to this end the invention consists in a grooved rail combined with a reversible or adjustable cord or strip of vulcanized india-rubber or other elastic and practically incompressible material, a portion of which projects above the rail and comes in direct contact with the wheels passing over the road.

In the drawing, A represents the rail, which may be of any approved form and construction, and may be made in one piece or of two or more pieces fastened together. In the tread of the rail a longitudinal recess, e, is formed, wider below than at the surface of the tread, and of such shape as to permit the turning and adjusting of the material contained by it and to present no sharp internal angles to weaken the rail. To this end I adapt a groove or recess the cross-section of which is a segment of a circle larger than a semicircle, as shown in the drawing, in order that the contracted opening may hold the contained material securely in place; and I combine therewith a round rope or cord of india-rubber, which fits closely into the recess, leaving the upper edge of the rubber projecting above the tread, as shown in the drawing. This form of recess presents no internal angles, and thereby does not essentially weaken the rail, and it enables the contained rope or cord to be turned from time to time, as the exposed surface becomes worn or injured, in order to present a new surface to the weather and to the wear of the wheels passing over the road. It is not essential that the groove and rubber be perfectly circular in outline, as any form of groove which has a contracted opening along the rail, the edges of which hold the rubber in place, and does not essentially weaken the rail, and permits the turning of the contained rubber so as to expose new surfaces thereof from time to time, will answer the purpose and be the equivalent of the circular recess and rubber.

The rubber ropes or cords in the form described are already known in the arts, and can be obtained in the market without the necessity of manufacturing them specially for the purpose. It is recommended that cords of from one inch to one and one-half inch in diameter be employed, the top to project above the tread of the rail to about the proportional distance shown in the drawing. A cord of such form and dimensions will be strong and durable, and will have sufficient depth and body to give the projecting portion great elasticity. The car-wheels will, of course, rest mainly on the tread of the rail, and the rubber pressing against them, and against the sides and bottom of the recess e will materially reduce the vibrations of both rails and wheels.

I am aware that it has been proposed to partially embed strips of rubber, leather, and wood in dovetail recesses formed in the tread of the rails, and I lay no claim thereto; but

I claim as my invention—

The combination of the grooved rail A with a reversible cord, R, of rubber or other elastic incompressible material arranged in the groove, with the upper edge thereof projecting above the tread of the rail, substantially as described.

ROSIA W. WELCH.

Witnesses:
L. HILL,
WILLIAM BLACKSTOCK.